US009139788B2

(12) United States Patent
Russell et al.

(10) Patent No.: US 9,139,788 B2
(45) Date of Patent: Sep. 22, 2015

(54) SYSTEM AND METHOD FOR DRY FEED GASIFIER START-UP (75) Inventors: Steven Craig Russell, Houston, TX (US); Ali Ergut, Houston, TX (US); Jamal Abdul Ferguson, Houston, TX (US)

(73) Assignee: General Electric Company, Schenectady, NY (US)

( * ) Notice: Subject to any disclaimer, the term of this patent is extended or adjusted under 35 U.S.C. 154(b) by 526 days.

(21) Appl. No.: 12/851,690

(22) Filed: Aug. 6, 2010

(65) Prior Publication Data

US 2012/0031000 A1 Feb. 9, 2012

(51) Int. Cl.
*C10J 3/72* (2006.01)
*C10J 3/00* (2006.01)
*C10J 3/48* (2006.01)

(52) U.S. Cl.
CPC ................. *C10J 3/726* (2013.01); *C10J 3/485* (2013.01); *C10J 2300/093* (2013.01); *C10J 2300/0983* (2013.01)

(58) Field of Classification Search
USPC .................. 48/61, 76, 77, 75, 78, 63, 93–94, 48/DIG. 10; 422/108
See application file for complete search history.

(56) References Cited

U.S. PATENT DOCUMENTS

| 4,426,938 | A | 1/1984 | Leikert et al. |
| 4,436,038 | A | 3/1984 | Leikert et al. |
| 4,466,363 | A | 8/1984 | Leikert et al. |
| 4,501,206 | A | 2/1985 | Leikert |
| 4,552,076 | A | 11/1985 | McCartney |
| 4,885,999 | A | 12/1989 | Baba et al. |
| 5,365,865 | A | 11/1994 | Monro |
| 5,380,342 | A | 1/1995 | Leonard, III et al. |
| 5,513,583 | A * | 5/1996 | Battista .......................... 110/261 |
| 5,656,044 | A * | 8/1997 | Bishop et al. ............... 48/197 R |
| 5,685,242 | A | 11/1997 | Narato et al. |
| 5,806,443 | A | 9/1998 | Kobayashi et al. |
| 6,237,510 | B1 * | 5/2001 | Tsumura et al. .............. 110/262 |
| 6,964,696 | B2 * | 11/2005 | Malatak et al. ................. 95/163 |

(Continued)

FOREIGN PATENT DOCUMENTS

| CN | 1102246 A | 5/1995 |
| CN | 2217192 Y | 1/1996 |

(Continued)

OTHER PUBLICATIONS

Unofficial English translation of CN Office Action dated Dec. 4, 2013 from corresponding Application No. 201110230223.3.

*Primary Examiner* — Kaity Handal
(74) *Attorney, Agent, or Firm* — Armstrong Teasdale LLP (57) ABSTRACT A gasification system including a first feed line, a second feed line, a stabilization fuel line, and a fuel feed system controller including a processor. The processor is programmed to enable the stabilization fuel line to inject a stabilization fuel into a gasifier to initiate a stabilizer flame inside the gasifier, enable the first feed line to inject a dry fuel into the gasifier at a start-up dry fuel flow rate, increase the flow rate of the dry fuel from the start-up dry fuel flow rate to a normal operating condition (NOC) dry fuel flow rate, decrease a flow rate of the stabilization fuel as the flow rate of the dry fuel increases to the NOC dry fuel flow rate, and prevent the stabilization fuel line from injecting the stabilization fuel into the gasifier once the flow rate of the dry fuel is at the NOC dry fuel flow rate.

14 Claims, 9 Drawing Sheets (56) References Cited

U.S. PATENT DOCUMENTS

| | | |
|---|---|---|
| 7,229,483 B2 | 6/2007 | Lewis |
| 2004/0107835 A1 | 6/2004 | Malatak et al. |
| 2008/0072807 A1* | 3/2008 | Brookes ................. 110/346 |
| 2008/0256860 A1* | 10/2008 | Von Kossak-Glowczewski .... 48/201 |
| 2009/0308205 A1* | 12/2009 | Dry ................... 75/707 |

FOREIGN PATENT DOCUMENTS

| | | |
|---|---|---|
| CN | 2608844 | 3/2004 |
| CN | 201177258 | 1/2009 |
| CN | 101463257 A | 6/2009 |
| RU | 217469 | 10/2001 |
| WO | 2009116275 A1 | 9/2009 |

* cited by examiner

Figure 9

SYSTEM AND METHOD FOR DRY FEED GASIFIER START-UP

BACKGROUND OF THE INVENTION

The field of the disclosure relates generally to gasification, and more specifically to a system and method for providing and maintaining a flame in a gasifier during start-up.

It is known to ignite pulverized-coal burner flames by means of a pulverized-coal pilot-burner. The pilot-burner itself requires an initial ignition in order to be able to ignite a pilot-burner flame. However, coal itself is poor in ignitability, and therefore, if a certain amount of thermal energy and coal particles are not contained in a coal/oxidizer mixture used to ignite a pilot-burner, ignition does not take place at all.

In addition to using a pilot-burner flame during start-up, conventional systems also utilize a pilot-burner flame continuously throughout gasification to provide energy for a reaction/gasification. However, in addition to poor ignitability, a dry coal feed is very difficult to control during gasification start-up and throughout the gasification process. For example, dry coal may be transported by a compressible fluid into a conveyance system that is designed for normal operating conditions that consist of much higher pressure and a much higher coal flow rate than are present at start-up. Further, a feeding mechanism of coal into a transport line is very sensitive at low flow conditions. Therefore, because flow rate control and flow variation are critical to gasifier start-up, it is advantageous to use a method that is reliable in gasifier start-up.

BRIEF DESCRIPTION OF THE INVENTION

In one aspect, a gasification system is provided. The gasification system includes a fuel feed system coupled in flow communication with the gasifier. The fuel feed system including a first feed line for injecting conveyance gas and dry fuel into the gasifier; a second feed line for injecting a slurry of coal or a moderator into the gasifier; a stabilization fuel line for injecting a stabilization fuel or a moderator into the gasifier; and a fuel feed system controller including a processor. The processor programmed to enable the stabilization fuel line to inject the stabilization fuel into the gasifier to initiate a stabilizer flame inside the gasifier; enable the first feed line to inject the dry fuel into the gasifier at a start-up dry fuel flow rate; increase the flow rate of the dry fuel from the start-up dry fuel flow rate to a normal operating condition dry fuel flow rate; decrease a flow rate of the stabilization fuel as the flow rate of the dry fuel increases to the normal operating condition dry fuel flow rate; and prevent the stabilization fuel line from injecting the stabilization fuel into the gasifier once the flow rate of the dry fuel is at the normal operating condition dry fuel flow rate or a gasifier reaction is stable.

In another aspect, a gasification system is provided. The gasification system includes a gasifier and a fuel feed system coupled in flow communication with the gasifier. The fuel feed system includes a first feed line and a second feed line. The gasification system further includes a fuel feed system controller that includes a processor. The processor programmed to enable an initiation of a stabilizer flame inside the gasifier, enable the first feed line to inject a dry fuel into the gasifier at a start-up dry fuel flow rate once the stabilizer flame is initiated, and increase the flow rate of the dry fuel from the start-up dry fuel flow rate to a normal operating condition dry fuel flow rate.

In yet another aspect, a method for maintaining a flame during start-up of a gasification system that includes a gasifier. The method includes providing one of a stabilization fuel and a slurry of coal to the gasifier during a start-up, enabling initiation of a stabilizer flame inside the gasifier using at least one of the stabilization fuel or the slurry of coal, increasing a flow rate of dry fuel provided to the gasifier from a start-up dry fuel flow rate to a normal operating condition dry fuel flow rate, decreasing a flow rate of the one of the stabilization fuel or the slurry of coal as the flow rate of the dry fuel increases to the normal operating condition dry fuel flow rate, ceasing operation of the stabilizer flame, and continuing a gasification process.

BRIEF DESCRIPTION OF THE DRAWINGS

The present disclosure is described in detail below with reference to the attached drawing figures.

DETAILED DESCRIPTION OF THE INVENTION

A dry coal feed can be very difficult to control during a gasification start-up of a dry coal gasifier. While flow variation and flow rate control of coal are critical to gasifier performance, it can be difficult to control the flow variation and the flow rate of coal during start-up. Therefore, if a flow rate of coal is not stable and is not homogeneous going into a gasifier during an ignition process, a fluctuation may occur that may change a flow rate of coal or may even cause a flashback into an injector. Thus, because dry coal is being transported by a compressible fluid into a conveyance system that is designed for normal operating conditions that consist of much higher pressure and much higher coal flow rate than is present at start-up, it is not only a challenge to ignite a dry feed gasifier, but it is also a challenge to maintain a stable flame during start-up of the dry feed gasifier.

In some embodiments described herein, instead of using only dry fuels (e.g., dry coal) or a slurry of coal to ignite a flame in a gasifier during a start-up/ignition process, stabilization fuel is utilized to provide a stabilizer flame by injecting the stabilization fuel into the gasifier during a start-up/ignition process of the gasifier. In embodiments, a stabilization fuel may be either a gas, liquid, or a solid. In other embodiments, a combination of a dry fuel and a stabilization fuel, or a slurry of coal and a stabilization fuel may be used to provide a stabilizer flame. Utilizing stabilization fuel to initiate a stabilizer flame may eliminate a need for start-up equipment, such as an independent startup conveyance circuit including a cyclone, collection vessel, baghouse, valves, and the like, while also improving gasifier refractory life by, for example, harsh temperature fluctuations in a gasifier during start-up.

An exemplary technical effect of the methods and systems described herein includes at least one of (a) enabling a stabilization fuel line to inject a stabilization fuel into a gasifier to initiate a stabilizer flame inside the gasifier; (b) enabling a dry feed line to inject a dry fuel into the gasifier at a start-up dry fuel flow rate; (c) increasing the flow rate of the dry fuel from the start-up dry fuel flow rate to a normal operating condition dry fuel flow rate; (d) decreasing a flow rate of the stabilization fuel as the flow rate of the dry fuel increases to the normal operating condition dry fuel flow rate; and (e) preventing the stabilization fuel line from injecting the stabilization fuel into the gasifier once the flow rate of the dry fuel is at the normal operating condition dry fuel flow rate or the gasifier reaction is stable.

Figure 1:
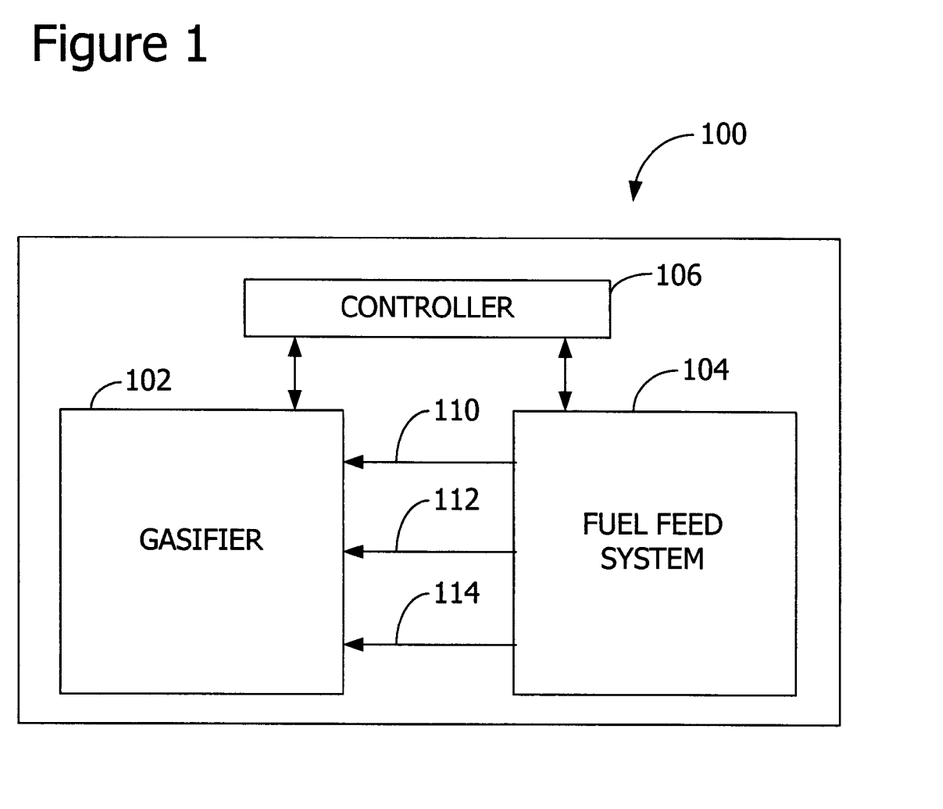
FIG. 1 is a block diagram of a portion of a gasification system.

With reference to FIG. 1, a block diagram of a portion of a gasification system 100 is provided. Gasification system 100 includes a gasifier 102, a fuel feed system 104 coupled in flow communication with gasifier 102, and a fuel feed system controller (e.g., controller 106). Components of gasification system 100 illustrated herein may be implemented in a dry feed system, a coal slurry system or moderator system, or a combination thereof. For example, fuel feed system 104 may include a dry feed line 110 for injecting conveyance gas and dry fuel (e.g., dry coal) or a stabilization fuel into gasifier 102, and fuel feed system 104 may also include a slurry feed line 112 for injecting a slurry of coal or a stabilization fuel into gasifier 102. In a further embodiment, fuel feed system 104 includes a stabilization fuel line 114 for injecting a stabilization fuel or a moderator into gasifier 102. In embodiments, the moderator may be a gas or a liquid.

Controller 106 includes at least one processor 106. In embodiments, processor 106 is transformed into a special purpose microprocessor by executing computer-executable instructions or by otherwise being programmed. For example, processor 106 is programmed with instructions to enable stabilization fuel line 114 to inject stabilization fuel into gasifier 102 to initiate a stabilizer flame inside gasifier 102. Further, processor 106 is programmed with instructions to enable the dry feed line 110 to inject dry fuel into the gasifier 102 at a start-up dry fuel flow rate once the stabilizer flame is initiated, increase the flow rate of the dry fuel from a start-up dry fuel flow rate to a normal operating condition dry fuel flow rate, decrease a flow rate of the stabilization fuel as the flow rate of the dry fuel increases to the normal operating condition dry fuel flow rate, and continue the gasification process while preventing the stabilization fuel line 114 from injecting the stabilization fuel into the gasifier 102 once the flow rate of the dry fuel is at the normal operating condition dry fuel flow rate or the gasifier reaction is stable. In addition, processor 106 is programmed with instructions such as illustrated in FIGS. 3, 5, 7, and 9.

Figure 2:
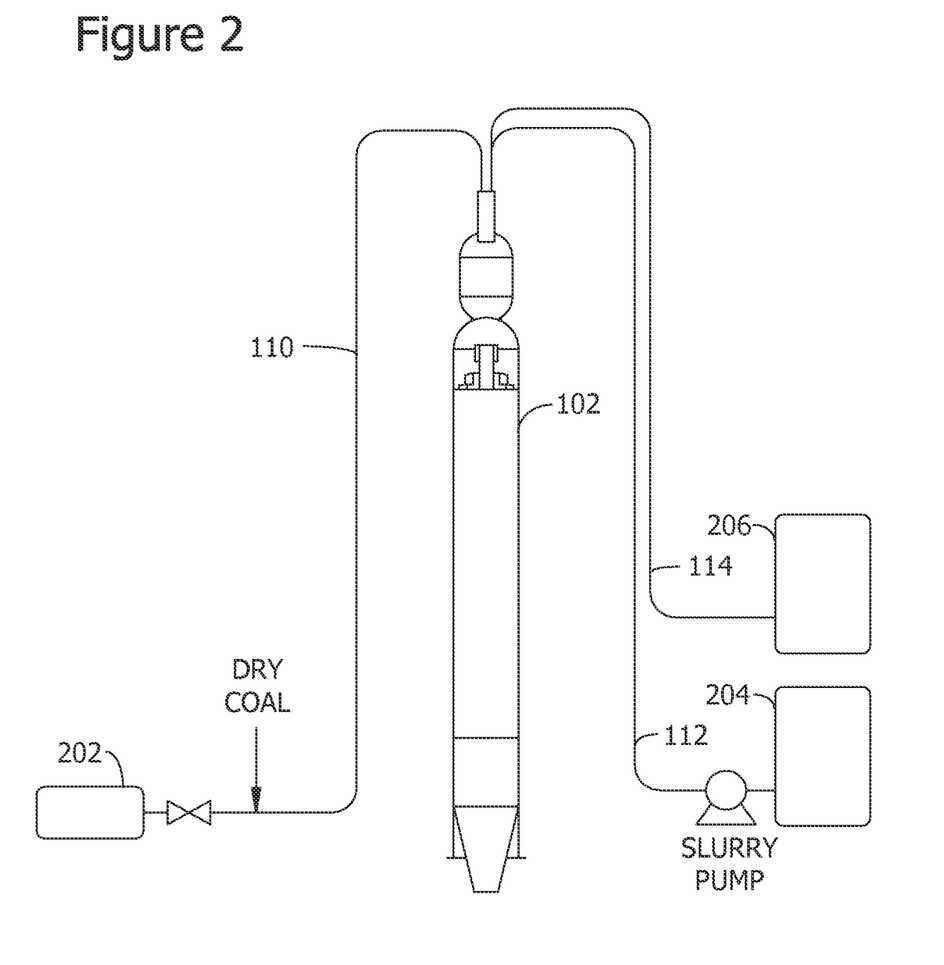
FIG. 2 is an illustrative example of a gasifier where a stabilizer flame is provided using a stabilization fuel that is supplied through a stabilization fuel line.

FIG. 2 illustrates an embodiment of gasification system 100 where stabilization fuel is supplied to gasifier 102 from stabilization fuel supply 206 via stabilization fuel line 114 that is separate from a slurry feed or a moderator feed provided by feed line 112 and dry feed line 110 to provide a stabilizer flame during a start-up/ignition process of gasifier 102. In this embodiment, a coal slurry or moderator is supplied to gasifier 102 from supply 204. Thus, as used herein, the term supply 204 may include either a coal slurry supply or a moderator supply. Further, feed line 112 may supply gasifier 102 with either a coal slurry or a moderator and a dry fuel is supplied to gasifier 102 from dry fuel supply 202 via dry feed line 110.

Figure 3:
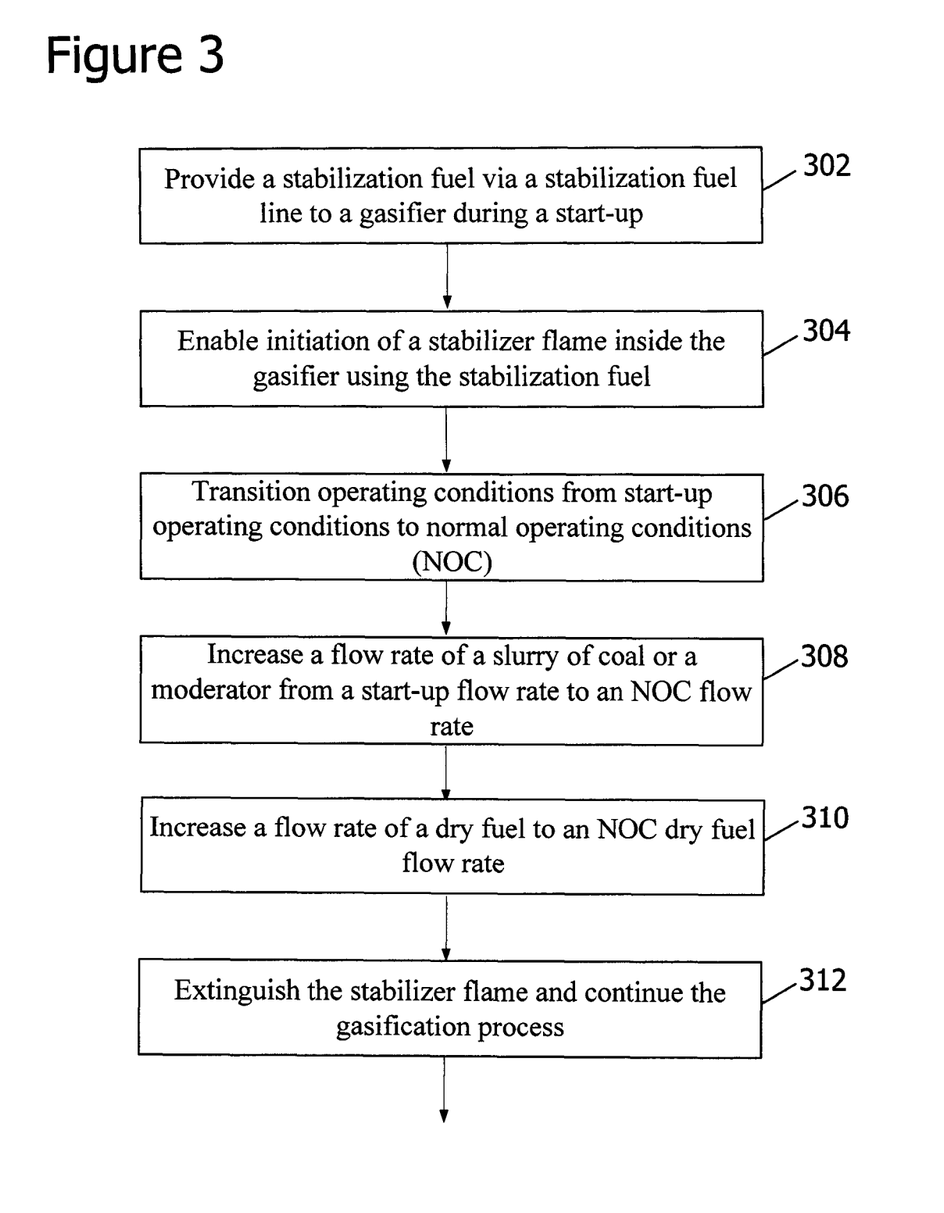
FIG. 3 is a process flow diagram of an exemplary fuel feed system coupled in flow communication with the gasifier shown in FIG. 2.

FIG. 3 is a process flow diagram of an exemplary fuel feed system coupled to gasifier 102, as shown in FIG. 2. At 302, a stabilization fuel is provided to gasifier 102 via stabilization fuel line 114 during a start-up (e.g., prior to an introduction of a dry fuel). During a start-up process, the stabilization fuel is supplied to gasifier 102 to provide a stabilizer flame during a start-up/ignition process of gasifier 102. Further, during the start-up/ignition process, a slurry of coal of about 1% to about 10% of the NOC flow rate of the fuel feed system 104 is provided to gasifier 102 via feed line 112, or only a moderator (e.g., water) is provided to the fuel feed system 104 via feed line 112, and as dry fuel is not provided to gasifier 102 during the start-up/ignition process, a conveyance gas is provided to gasifier 102 via dry feed line 110 to keep dry feed line 110 purged during the start-up/ignition process. At 304, initiation of a stabilizer flame inside gasifier 102 using the stabilization fuel is enabled. At 306, once the stabilizer flame is established, operating conditions, for example, a flow rate of the stabilization fuel, the slurry of coal or a moderator, and the dry fuel transition from start-up operating conditions to normal operating conditions (NOC). For example, at 308, the flow rate of the slurry of coal may be increased from a start-up coal slurry flow rate to an NOC coal slurry flow rate of about 1% to about 10% of fuel feed system 104. Further, at 310, the flow rate of the dry fuel increases from 0% during the start-up/ignition process to an NOC dry fuel flow rate between about 90% and about 99% of a total flow rate of fuel feed system 104. In one embodiment, the NOC dry fuel flow rate may be 100% of a total flow rate of fuel feed system 104 if a coal slurry is not provided. Next, once the dry fuel feed is established, at 312, the flow rate of the stabilization fuel is decreased to 0%, the stabilizer flame is extinguished, and the gasification process continues without a need for the stabilizer flame. However, in embodiments, if it is determined that a reaction in the gasification process is unstable, or if it is determined that it is likely that a reaction in the gasification process will become unstable, the stabilizer flame may be re-initiated, and thereafter, once the reaction becomes stable, the stabilizer flame can once again be extinguished. For example, a reaction may become unstable if there is unsteady transient behavior in fuel or oxygen feeding systems as flow rates and pressures are increased throughout a startup process, or when a system is transitioning from startup conditions to turndown conditions (e.g., 50% of a normal flow rate). Further, gas valves or solids feeding mechanisms may produce unsteady flows, which may also cause a reaction to become unstable. In one embodiment, with a flow rate of the stabilization fuel at 0%, the fuel line 114 provides a moderator to gasifier 102 to keep the fuel line 114 purged.

Figure 4:
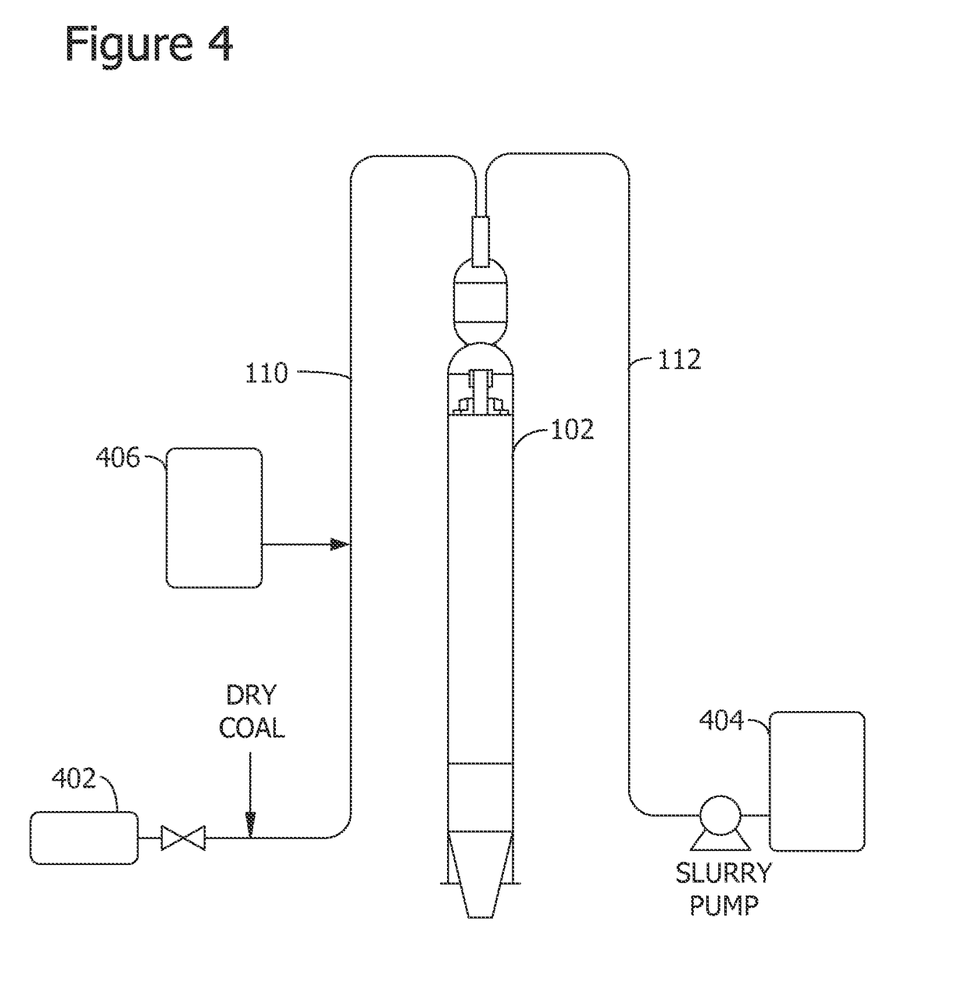
FIG. 4 is an illustrative example of a gasifier where a stabilizer flame is provided using a stabilization fuel that is supplied through a dry feed line.

FIG. 4 illustrates an embodiment of gasification system 100 where the stabilization fuel is supplied to gasifier 102 from stabilization fuel supply 406 via dry feed line 110 to provide a stabilizer flame during a start-up/ignition process of gasifier 102. In this embodiment, a coal slurry or moderator is supplied to gasifier 102 from supply 404 via feed line 112, and a dry fuel is supplied to gasifier 102 from dry fuel supply 402 via dry feed line 110.

Figure 5:
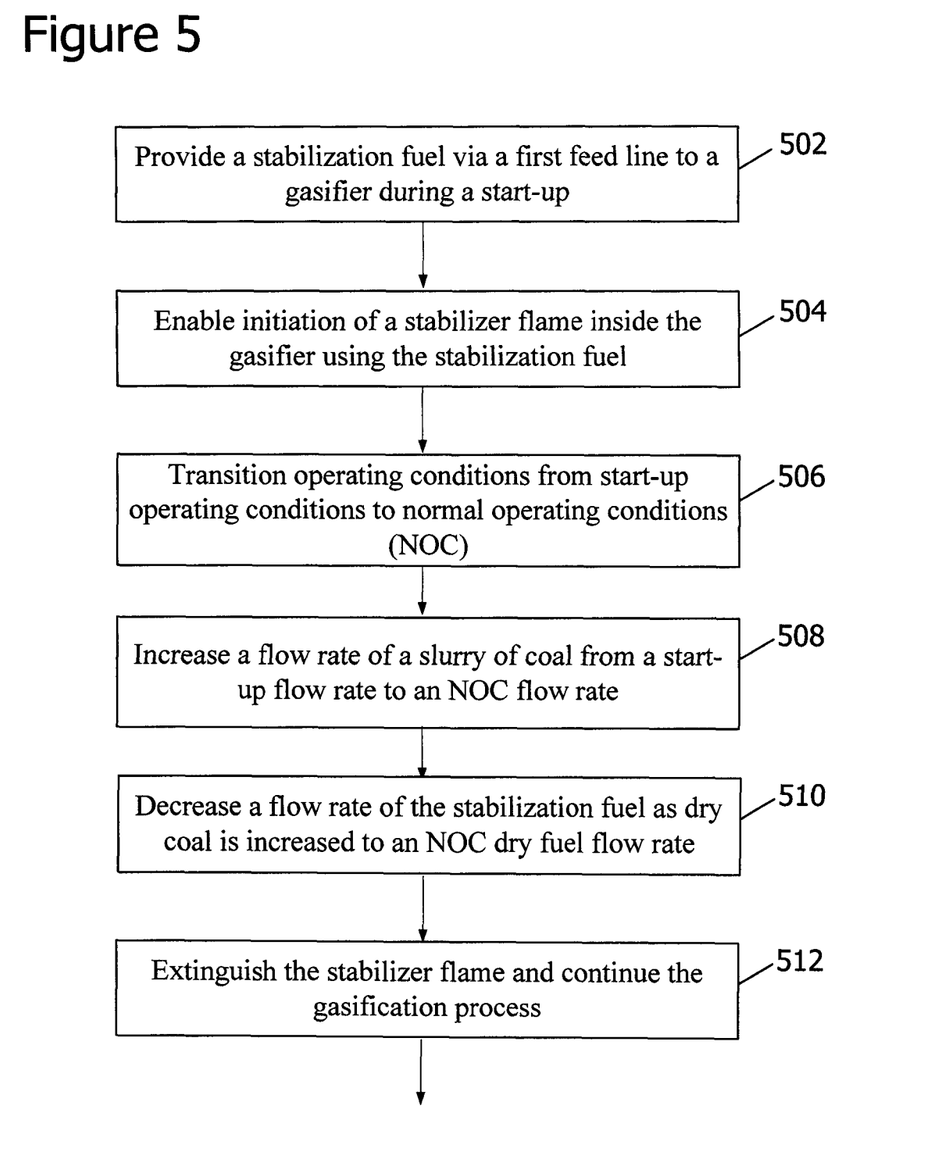
FIG. 5 is a process flow diagram of an exemplary fuel feed system coupled in flow communication with the gasifier shown in FIG. 4.

FIG. 5 is a process flow diagram of an exemplary fuel feed system coupled to gasifier 102, as shown in FIG. 4. At 502, the stabilization fuel is supplied to gasifier 102 via dry feed line 110 during a start-up. During a start-up/ignition process, the stabilization fuel is supplied to gasifier 102 to provide a stabilizer flame during a start-up/ignition process of gasifier 102. Further, during the start-up/ignition process, a slurry of coal of about 1% to about 10% of a NOC flow rate of the fuel feed system 104 is provided to gasifier 102 via feed line 112, or only a moderator is provided to fuel feed system 104 via feed line 112. At 504, initiation of a stabilizer flame inside gasifier 102 using the stabilization fuel is enabled. At 506, once the stabilizer flame is established, operating conditions, for example, a flow rate of the stabilization fuel, the slurry of coal or a moderator, and the dry fuel transition from start-up operating conditions to NOC. For example, at 508, the flow rate of the slurry of coal may be increased from a start-up coal slurry flow rate to an NOC coal slurry flow rate of about 1% to about 10%. At 510, the flow rate of the stabilization fuel is gradually decreased, and replaced with conveyance gas, as dry fuel is provided to gasifier 102. Thus, a flow rate of the dry fuel increases from 0% during the start-up/ignition process to an NOC dry fuel flow rate between about 90% and about 99% of a total flow rate of fuel feed system 104. Next, at 512, as the dry fuel feed is established (e.g., at NOC dry fuel flow rate), the flow rate of the stabilization fuel provided by dry feed line 110 is decreased to 0%, the stabilizer flame is extinguished, and the gasification process continues without a need for the stabilizer flame. However, in embodiments, if it is determined that a reaction in the gasification process is unstable, or if it is determined that it is likely that a reaction in the gasification process will become unstable, the stabilizer flame may be re-initiated, and once the reaction becomes stable, the stabilizer flame can once again be extinguished.

Figure 6:
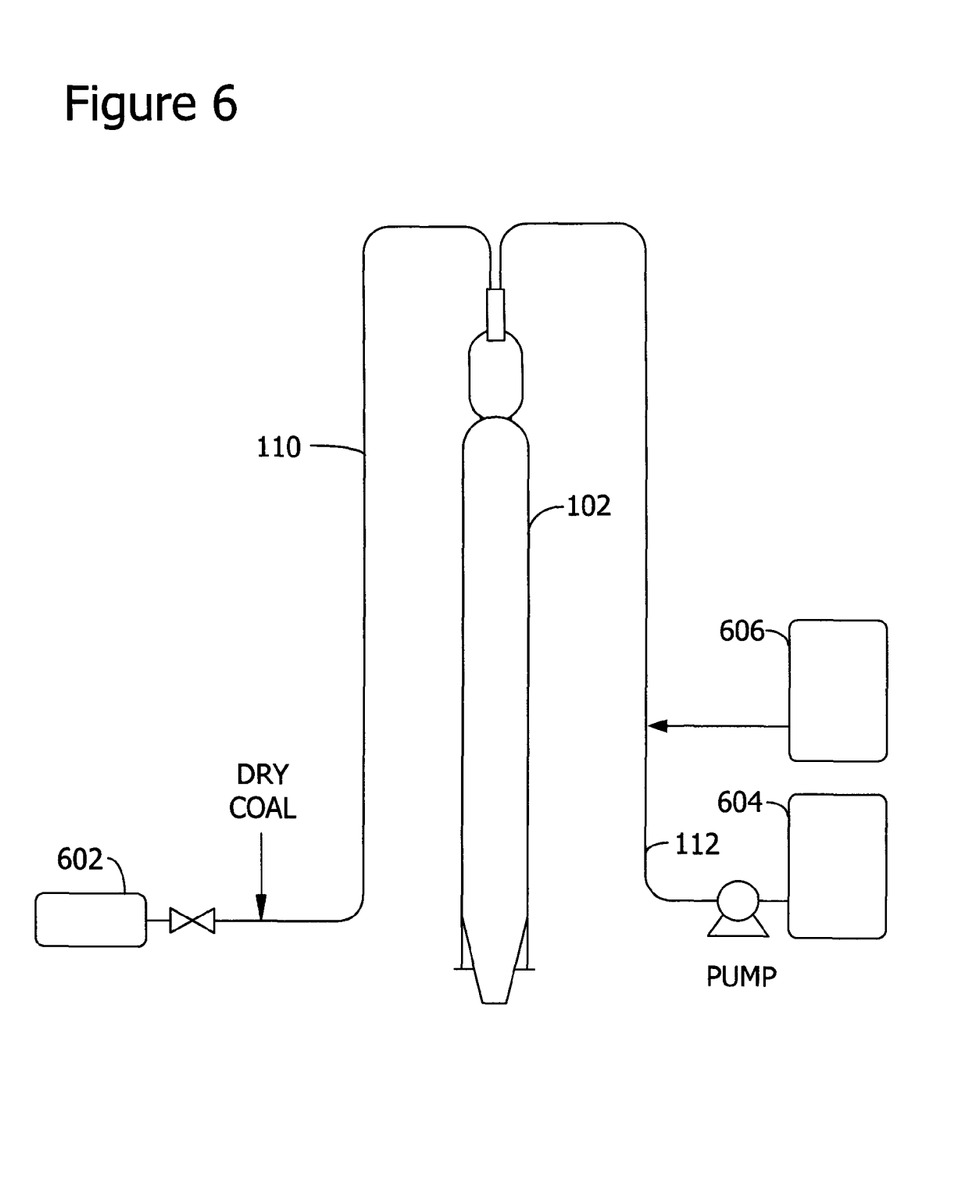
FIG. 6 is an illustrative example of a gasifier where a stabilizer flame is provided using a stabilization fuel that is supplied through a slurry feed or moderator feed line.

FIG. 6 illustrates an embodiment of gasification system 100 where the stabilization fuel is provided to gasifier 102 from stabilization fuel supply 606 via feed line 112 to provide a stabilizer flame during a start-up/ignition process of gasifier 102. Thus, because an amount of coal in a slurry of coal may not be enough to provide a stabilizer flame or because the moderator has no chemical potential energy, the stabilization fuel is added to the slurry of coal, and a combination of the stabilization fuel and the slurry of coal or moderator is provided to gasifier 102 via feed line 112. In this embodiment, a coal slurry or moderator is supplied to gasifier 102 from supply 604 via feed line 112, and a dry fuel is supplied to gasifier 102 from dry fuel supply 602 via dry feed line 110.

Figure 7:
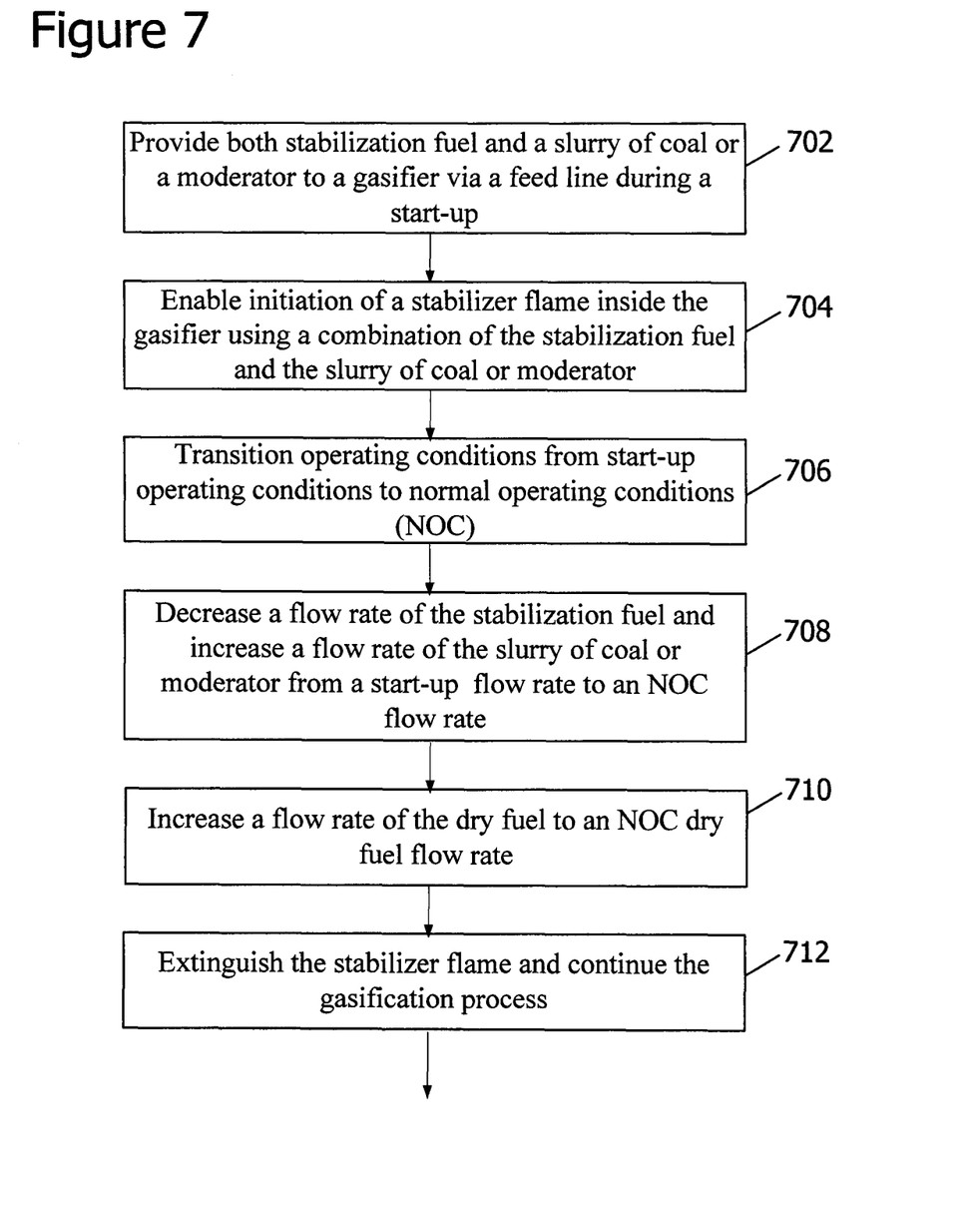
FIG. 7 is a process flow diagram an exemplary fuel feed system coupled in flow communication with the gasifier shown in FIG. 6.

FIG. 7 is a process flow diagram of an exemplary fuel feed system coupled to gasifier 102. At 702, both a stabilization fuel and a slurry of coal or a moderator are provided to gasifier 102 via feed line 112 during a start-up. During a start-up/ignition process, the stabilization fuel is provided to gasifier 102 with the slurry of coal at a flow rate of about 1% to about 10% of NOC flow rate via feed line 112, or the stabilization fuel is provided to gasifier 102 with a moderator via feed line 112 to provide a stabilizer flame during a start-up/ignition process of gasifier 102. Further, during the start-up/ignition process, the dry fuel is not provided to gasifier 102 while a conveyance gas is provided to gasifier 102 via dry feed line 110 to keep dry feed line purged during the start-up/ignition process. At 704, initiation of a stabilizer flame inside gasifier 102 is enabled using a combination of the stabilization fuel and the slurry of coal or moderator. At 706, once the stabilizer flame is established, operating conditions, for example, a flow rate of the stabilization fuel, a flow rate of the slurry of coal or moderator, and a flow rate of the dry fuel transition from start-up operating conditions to NOC. For example, at 708, the flow rate of the stabilization fuel begins to decrease and the flow rate of the slurry of coal is increased from a start-up coal slurry flow rate to an NOC coal slurry flow rate of about 1% to about 10%. Further, at 710, a flow rate of the dry fuel increases from 0% during the start-up/ignition process to an NOC dry fuel flow rate between about 90% and about 99% of a total flow rate of fuel feed system 104. Next, at 712, once the dry fuel feed is established, the flow rate of the stabilization fuel is decreased to 0%, the stabilizer flame extinguishes, and the gasification process continues without a need for the stabilizer flame. However, in embodiments, if it is determined that a reaction in the gasification process is unstable, or if it is determined that it is likely that a reaction in the gasification process will become unstable, the stabilizer flame may be re-initiated, and once the reaction becomes stable, the stabilizer flame can once again be extinguished.

Figure 8:
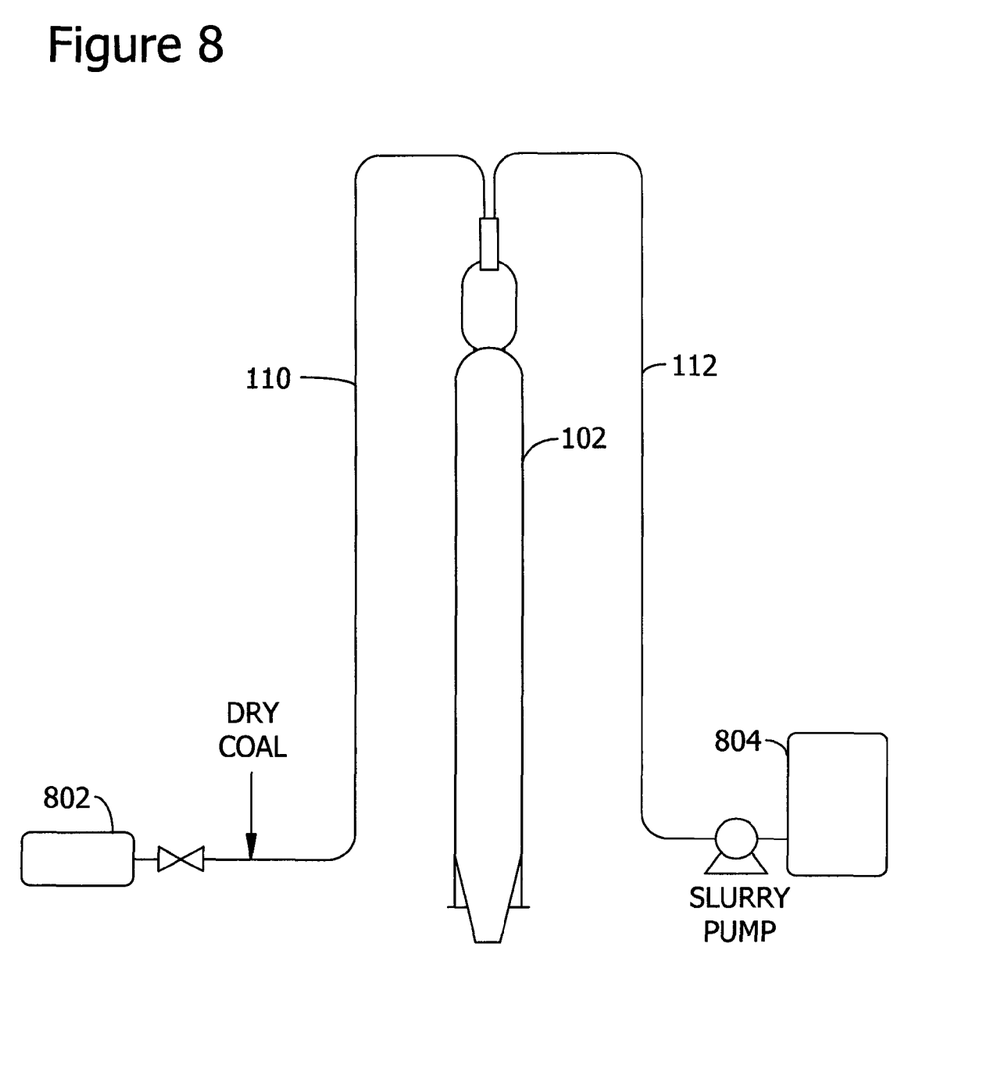
FIG. 8 is an illustrative example of a gasifier where a stabilizer flame is provided using a slurry of coal that is supplied through a slurry feed line.

FIG. 8 illustrates an embodiment of gasification system 100 where a stabilizer flame is provided via a slurry of coal supplied from a coal slurry supply 804 via slurry feed line 112. As mentioned above, an amount of coal in a slurry of coal may not be enough to provide a stabilizer flame. Therefore, in this embodiment, the amount of coal in the slurry of coal supplied to gasifier 102 is increased and/or a flow rate of the slurry of coal is increased to achieve enough coal to provide a stabilizer flame in gasifier 102. In this example, a dry fuel is supplied to gasifier 102 from dry fuel supply 802 via dry feed line 110. In embodiments, a start-up range of an amount of coal in a slurry of coal is about 10% to 50% of total fuel NOC flow rate. In a further embodiment, both the amount of coal in the slurry of coal and a flow rate of the slurry of coal may be increased to reach a high coal flow rate. However, there may be a "slurryability" limit of coal/(coal+water) of about 40% to about 70%. If the coal concentration becomes too high, the slurry of coal is so viscous, the slurry of coal will not flow properly, or at all.

Figure 9:
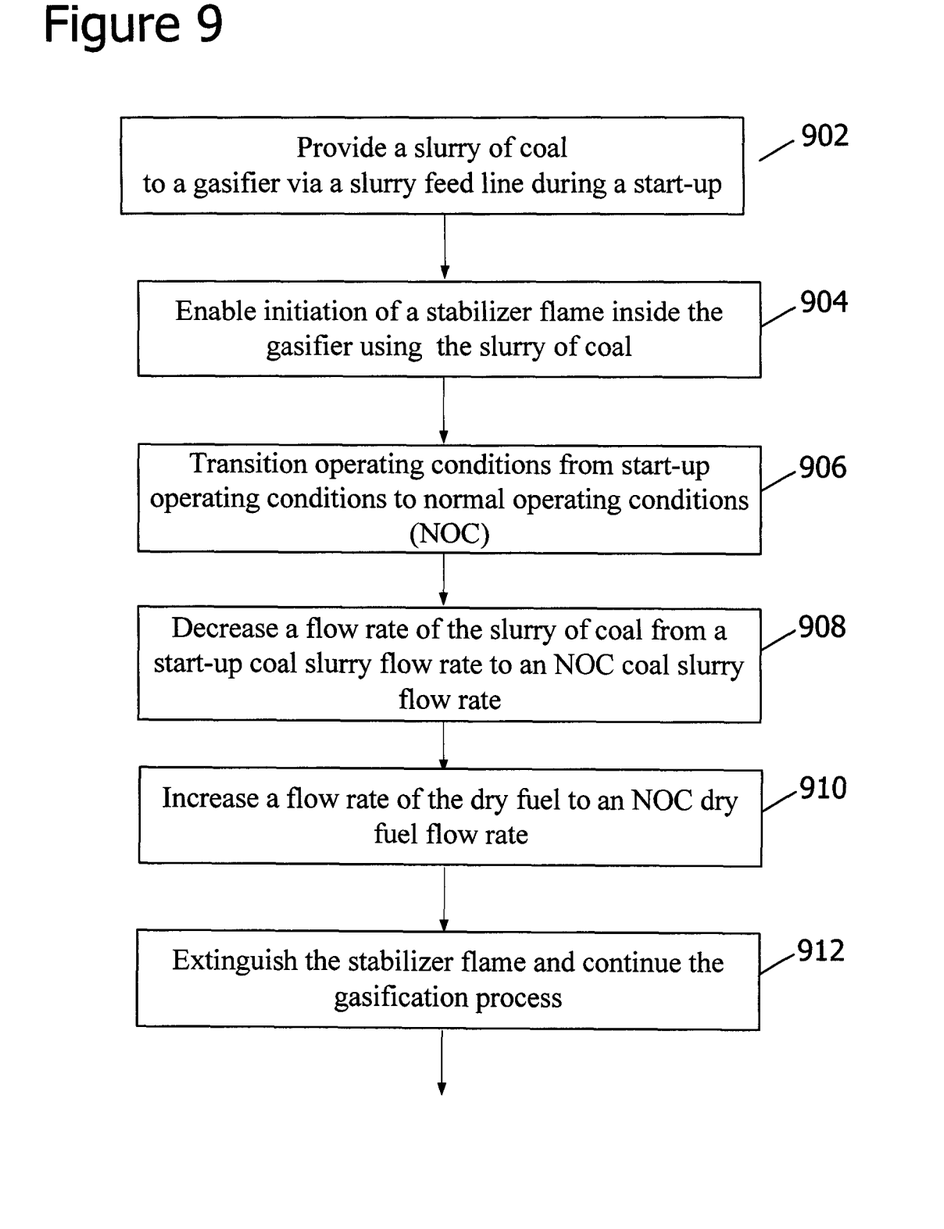
FIG. 9 is a process flow diagram of an exemplary fuel feed system coupled in flow communication with the gasifier shown in FIG. 8.

FIG. 9 is a process flow diagram of an exemplary fuel feed system coupled in flow communication with gasifier 102. At 902, a slurry of coal is provided to gasifier 102 via slurry feed line 112 during a start-up. During a start-up/ignition process, the slurry of coal is provided to gasifier 102 via the slurry feed line 112 to provide a stabilizer flame during a start-up/ignition process of gasifier 102. In this embodiment, because only the slurry of coal is provided to gasifier 102 to provide a stabilizer flame, an amount of coal and/or a flow rate of the slurry of coal is increased beyond an amount of coal and/or a flow rate of a slurry of coal previously stated in prior embodiments. For example, a flow rate of the slurry of coal in this embodiment is about 10% to about 50% of a total flow rate of fuel feed system 104. Further, during the start-up/ignition process, because the dry fuel is not provided to gasifier 102, conveyance gas is provided to gasifier 102 via dry feed line 110 to keep dry feed line purged during the start-up/ignition process.

At 904, initiation of a stabilizer flame inside gasifier 102 using the slurry of coal is enabled. At 906, once the stabilizer flame is established, operating conditions, for example, a flow rate of slurry of coal and the dry fuel transition from start-up operating conditions to NOC. For example, at 908, the flow rate of the slurry of coal is decreased from a start-up coal slurry flow rate of about 10% to about 50% to an NOC coal slurry flow rate of about 1% to about 10%, or to an NOC coal slurry flow rate of 0%. Further, at 910, a flow rate of the dry fuel increases from 0% during the start-up/ignition process to an NOC dry fuel flow rate between about 90% and about 99% of a total flow rate of fuel feed system 104. Next, at 912, the stabilizer flame is extinguished and the gasification process continues without a need for the stabilizer flame. However, in embodiments, if it is determined that a reaction in the gasification process is unstable, or if it is determined that it is likely that a reaction in the gasification process will become unstable, the stabilizer flame may be re-initiated, and once the reaction becomes stable, the stabilizer flame can once again be extinguished The exemplary fuel feed system components illustrated are not limited to the specific embodiments described herein, but rather, components of each system may be utilized independently and separately from other components described herein. For example, the fuel system components described above may also be used in combination with different fuel system components.

Exemplary Operating Environment

A controller or computing device such as is described herein has one or more processors or processing units, system memory, and some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal, such as a carrier wave or other transport mechanism, and include any information delivery media. Combinations of any of the above are also included within the scope of computer readable media.

The controller/computer may operate in a networked environment using logical connections to one or more remote computers, such as a remote computer. Although described in connection with an exemplary computing system environment, embodiments of the present disclosure are operational with numerous other general purpose or special purpose computing system environments or configurations. The computing system environment is not intended to suggest any limitation as to the scope of use or functionality of any aspect of the present disclosure. Moreover, the computing system environment should not be interpreted as having any dependency or requirement relating to any one or combination of components illustrated in the exemplary operating environment. Examples of well known computing systems, environments, and/or configurations that may be suitable for use with aspects of the present disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the present disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the present disclosure may be implemented with any number and organization of such components or modules. For example, aspects of the present disclosure are not limited to the specific computer-executable instructions or the specific components or modules illustrated in the figures and described herein. Other embodiments of the present disclosure may include different computer-executable instructions or components having more or less functionality than illustrated and described herein. Aspects of the present disclosure may also be practiced in distributed computing environments where tasks are performed by remote processing devices that are linked through a communications network. In a distributed computing environment, program modules may be located in both local and remote computer storage media including memory storage devices.

Aspects of the present disclosure transform a general-purpose computer into a special-purpose computing device when configured to execute the instructions described herein.

The order of execution or performance of the operations in embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

When introducing elements of aspects of the present disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the present disclosure in detail, it will be apparent that modifications and variations are possible without departing from the scope of aspects of the present disclosure as defined in the appended claims. As various changes could be made in the above constructions, products, and methods without departing from the scope of aspects of the present disclosure, it is intended that all matter contained in the above description and shown in the accompanying drawings shall be interpreted as illustrative and not in a limiting sense.

This written description uses examples to disclose the claimed subject matter, including the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gasification system comprising:
   a gasifier comprising an injector at a first end of said gasifier;
   a fuel feed system coupled in flow communication with said gasifier, said fuel feed system comprising:
      a first feed line in flow communication with said injector, said first feed line operable to inject conveyance gas and dry fuel into said gasifier;
      a second feed line in flow communication with said injector, said second feed line operable to inject a slurry of coal into said gasifier; and
      a stabilization fuel line in flow communication with said injector, said stabilization fuel line operable to selectively inject one of a stabilization fuel and a moderator into said gasifier; and
   a fuel feed system controller comprising a processor, said processor programmed to:
      enable said stabilization fuel line to inject the stabilization fuel into said gasifier to initiate a stabilizer flame inside said gasifier;
      enable said first feed line to inject the dry fuel into said gasifier at a start-up dry fuel flow rate;

increase the flow rate of the dry fuel from the start-up dry fuel flow rate to a normal operating condition dry fuel flow rate;

decrease a flow rate of the stabilization fuel as the flow rate of the dry fuel increases to the normal operating condition dry fuel flow rate; and prevent said stabilization fuel line from injecting the stabilization fuel into said gasifier once the flow rate of the dry fuel is at the normal operating condition dry fuel flow rate or a gasifier reaction is stable.

2. A gasification system in accordance with claim 1, wherein said processor of said fuel feed system controller is further programmed to enable said stabilization fuel line to inject the stabilization fuel into said gasifier to initiate a stabilizer flame inside said gasifier prior to enabling said first feed line to inject the dry fuel into said gasifier.

3. A gasification system in accordance with claim 1, wherein said processor of said fuel feed system controller is further programmed to enable said stabilization fuel line to inject the moderator into said gasifier once the flow rate of the stabilization fuel is zero.

4. A gasification system in accordance with claim 1, wherein the normal operating condition dry fuel flow rate is between about 90% and about 99% of a total flow rate of said fuel feed system.

5. A gasification system in accordance with claim 1, wherein after the stabilizer flame is established, the processor is further programmed to increase the flow rate of the slurry of coal from a start-up coal slurry flow rate to a normal operating condition slurry flow rate of between about 1% and 10%.

6. A gasification system in accordance with claim 1, wherein said processor of said fuel feed system controller is further programmed to enable said first feed line to inject the conveyance gas into said gasifier to keep said first feed line purged before said first feed line is enabled to inject the dry fuel into said gasifier.

7. A method for maintaining a flame during start-up of a gasification system comprising a gasifier, the method comprising:

providing one of a stabilization fuel and a slurry of coal to the gasifier during a start-up;

enabling initiation of a stabilizer flame inside the gasifier using at least one of the stabilization fuel or the slurry of coal;

increasing a flow rate of dry fuel provided to the gasifier from a start-up dry fuel flow rate to a normal operating condition dry fuel flow rate;

decreasing a flow rate of the one of the stabilization fuel or the slurry of coal as the flow rate of the dry fuel increases to the normal operating condition dry fuel flow rate;

ceasing operation of the stabilizer flame; and continuing a gasification process.

8. A method in accordance with claim 7, wherein the dry fuel is provided to the gasifier after the stabilizer flame is initiated.

9. A method in accordance with claim 7, wherein if the slurry of coal is used to initiate the stabilizer flame, a flow rate of the slurry of coal is provided at a start-up coal slurry flow between about 10% and about 50% of a total flow rate of the fuel feed system is provided to initiate the stabilizer flame.

10. A method in accordance with claim 8, further comprising decreasing the flow rate of the slurry of coal from the start-up coal slurry flow rate to a normal operating condition coal slurry flow rate at a flow rate between about 1% and about 10% of a total flow rate of the fuel feed system as the flow rate of the dry fuel provided to the gasifier is increased from the start-up dry fuel flow rate to the normal operating condition dry fuel flow rate.

11. A method in accordance with claim 7, wherein the normal operating condition dry fuel flow rate is between about 90% to about 99% of a total flow rate of the fuel feed system.

12. A method in accordance with claim 7, further comprising reestablishing the stabilizer flame if it is determined that a reaction for gasification is unstable.

13. A method in accordance with claim 7, wherein if the stabilization fuel is used to initiate the stabilizer flame, a flow rate of the stabilization fuel decreases to 0% of a total flow rate of the fuel feed system once the flow rate of the dry fuel is at the normal operating condition dry fuel flow rate.

14. A method in accordance with claim 13, further comprising providing a moderator to the gasifier once the flow rate of the stabilization fuel decreases to 0% of the total flow rate of the fuel feed system.

* * * * *